United States Patent [19]

Baseman et al.

[11] Patent Number: 5,134,038
[45] Date of Patent: Jul. 28, 1992

[54] THIN FILM MAGNETIC RECORDING MEDIUM WITH CONTROLLED GRAIN MORPHOLOGY AND TOPOLOGY

[75] Inventors: Robert J. Baseman, Brewster; Christopher V. Jahnes, Monsey; Igor Y. Khandros, Peekskill; Seyyed M. T. Mirzamaani, Croton-on-Hudson; Michael A. Russak, Brewster, all of N.Y.

[73] Assignee: International Business Machines Corporation, Armonk, N.Y.

[21] Appl. No.: 754,343

[22] Filed: Sep. 4, 1991

Related U.S. Application Data

[63] Continuation of Ser. No. 417,371, Oct. 5, 1989, abandoned.

[51] Int. Cl.⁵ .................................................. G11B 5/00
[52] U.S. Cl. ...................................... 428/611; 428/612; 428/614; 428/621; 428/660; 428/661; 428/642; 428/928; 428/939; 428/693; 428/694; 428/900; 428/336; 360/134; 360/135; 360/136
[58] Field of Search ............... 428/161, 209, 216, 336, 428/621, 678, 693, 611; 360/134, 135, 136

[56] References Cited

U.S. PATENT DOCUMENTS

| | | | |
|---|---|---|---|
| 4,493,856 | 1/1985 | Kumar et al. | 427/57 |
| 4,539,264 | 9/1985 | Yazawa et al. | 428/621 |
| 4,539,265 | 9/1985 | Yazawa et al. | 428/621 |
| 4,543,301 | 9/1985 | Yazawa et al. | 428/621 |
| 4,746,580 | 5/1988 | Bishop et al. | 428/557 |

FOREIGN PATENT DOCUMENTS

| | | |
|---|---|---|
| 0079391 | 5/1983 | European Pat. Off. |
| 62-103823 | 5/1987 | Japan |
| 62-112774 | 5/1987 | Japan |

OTHER PUBLICATIONS

C. Vahlas et al, "Adsorption-Induced Solid-Liquid Interfacial Roughening In Zn Alloys", J. Crystal Growth, vol. 92, No. 1-2, pp. 253-258, Oct. 1988.

I. Y. Khandros et al, "Thin-Film Topography Control with Transient Liquid Underlayer", J. Vac. Sci. Technology, A7(3), May/Jun. 1989, 1334-1340.

Primary Examiner—Merrell C. Cashion, Jr.
Assistant Examiner—Stevan A. Resan
Attorney, Agent, or Firm—Philip J. Feig

[57] ABSTRACT

A magnetic storage medium is composed of a non-wettable substrate upon which a transient liquid metal layer is deposited and maintained as a distribution of discontinuous liquid features. A magnetic film layer is deposited on the transient liquid metal layer resulting in a reaction of the liquid metal with the magnetic film. The topology of the magnetic film is controllable by adjusting the thickness of the transient liquid metal layer.

15 Claims, 8 Drawing Sheets

THIN FILM MAGNETIC RECORDING MEDIUM WITH CONTROLLED GRAIN MORPHOLOGY AND TOPOLOGY

This application is a continuation of application Ser. No. 07/417,371 filed Oct. 5, 1989, now abandoned.

BACKGROUND OF THE INVENTION

The present invention relates to a method of manufacturing a magnetic thin film medium with controlled grain morphology and topology. More particularly the invention is directed to a magnetic medium in which a magnetic thin film is deposited on a thin transient liquid metal layer deposited onto a non-wettable substrate, the surface topology and magnetic characteristics of the medium being controlled by adjustment of the thickness of the transient liquid metal underlayer and the deposition conditions.

The demand for increased capacity of storage media has resulted in the development of the magnetic thin film disk. The magnetic thin film disk should have a high and controllable coercivity, preferably in the range between 600 and 2000 Oe, and a high remanent magnetization. Binary or ternary cobalt-based alloys, such as CoCr, CoRe, CoPt, CoNi, CoNiCr, CoPtCr and the like are commonly used as the magnetic material in thin-film magnetic disk technology. Platinum is one of the key elements in achieving high coercivity, of greater than 900 Oe, required for disks. Depending upon the required range of coercivity, up to 20 percent of Pt can be added to Co based alloy.

The magnetic film is deposited on a non-magnetic substrate, typically NiP-coated Al-Mg or glass disks. The recording density of a medium is inversely proportional to the distance (fly height) between the disk and a magnetic head with which the information is being recorded. Thus the surface of the disk substrate should be extremely smooth to permit a lower fly height. However the extreme smoothness of&the disk generally results in a high contact area between the disk and head which, in turn, results in a high value of stiction or friction The high stiction or friction can cause damage to the disk, recording head and its assembly as well as disk drive motors. In order to alleviate the problem, an overcoat, typically carbon, as well as a lubricant are applied to the outermost film layer. However, extremely smooth disks even with a lubricant coating may still exhibit unacceptably high stiction and friction levels. Moreover, over a period of time the lubricant is removed from the disk surface. Therefore, a controlled surface topology or texture is required to enhance flyability and lubricant retention.

In order to overcome the problems of high stiction and friction, prior to the deposition of the magnetic layer the surface of the disk substrate is roughened by one of the common mechanical abrasive techniques known as texturing.

The mechanical texturing usually is associated with the formation of weldments and asperities along the texture lines. These weldments can result in an increase in fly height as well as severe wear of the magnetic layer during operation of the disk. Therefore, it is desirable to texture or roughen the substrate surface by means other than mechanical abrasion while not adversely affecting the disk magnetic properties.

It is also desirable to enhance coercivity of the magnetic disks while reducing the quantity and expense of platinum element additions.

In U.S. Pat. No. 4,539,264 entitled "Magnetic Recording Medium" a magnetic recording medium is described as having a non-magnetic substrate, a bismuth layer of less than 100Å thick and a magnetic metal thin film formed on the bismuth layer. While the described medium achieves increased coercivity levels, the bismuth layer remains as a discrete underlayer and the topological and alloying effects resulting from a transient liquid metal layer are not achieved. The patent also fails to suggest the application of a layer of metal film between the bismuth layer and the magnetic layer which is an alternative embodiment of the present invention.

SUMMARY OF THE INVENTION

The present invention overcomes the above difficulties by applying an underlayer of a transient liquid metal film between a non-wettable substrate and the magnetic thin film. The transient liquid metal layer is applied while the substrate, which is not wettable by the liquid metal, is maintained at a condition at which the liquid metal is in a liquid state, and preferably at a temperature above the melting point of the transient liquid metal. The result is that the liquid metal is caused to "ball-up" and form a layer of disconnected molten metal features. Instead of forming a distinct underlayer, a distribution of the concentration of the transient liquid metal across the grain of the magnetic layer is manifest. The transient liquid metal elements may be, but are not limited to, gallium, indium, tin, bismuth, lead, cadmium, mercury, selenium, tellurium and their alloys with other metals including silver, palladium, platinum, or gold as well as binary or ternary compounds of the transient liquids themselves. The preferred transient liquid metals are gallium, indium and tin. The substrate can be, but is not limited to, silicon dioxide, glass, polymers, or metal substrates treated in such a manner to be rendered non-wetting to the transient liquid metal, with glass being the preferred substrate material. The magnetic thin film may be an alloy of which cobalt is a major constituent, preferably Co-Pt-Cr, Co-Cr, Co-Ni-Cr, Co-Re.

In order to manufacture the medium in accordance with the present invention, the substrate is held at a temperature above or close to the melting point of the transient liquid metal during deposition of the transient liquid metal layer onto the substrate by conventional sputtering, evaporation, plating or other deposition techniques as are known in the art. The outer magnetic film layer is then deposited onto the transient liquid metal at either an elevated temperature above the melting point of the transient liquid metal or alternatively at a more conventional lower temperature at which the underlayer features, while undercooled, are nevertheless metastably liquid. The transient liquid metal will become alloyed with the magnetic layer thereby imparting to the magnetic layer a controlled topology which provides a disk surface with improved tribology. The magnetic medium will not include a pure transient liquid metal underlayer.

The advantages of the present invention include the elimination of the variability and dependence upon direction of the magnetic properties, control of the magnetic film surface roughness and control of the coercivity of the medium.

It will be apparent to those skilled in the art that the area of the medium surface subject to roughening can be limited by the use of known masking techniques.

When the described interaction between the magnetic film layer and the transient liquid metal underlayer is undesirable, it is possible to apply a metal film layer between the underlayer and a magnetic film outerlayer which will not adversely affect the surface topology. Moreover, the application of such an additional layer permits control of the surface topology over a wider range of roughness to improve the tribology while maintaining the coercivity of the film constant. Preferred metal films for the interlayer are, but not limited to, chromium, molybdenum, vanadium, palladium and platinum, or alloys of these metals.

A principal object of the present invention is therefore, the provision of a magnetic medium with controlled surface morphology and topology, and magnetic characteristics.

Another object of the invention is the provision of a method of manufacturing a magnetic medium composed of a non-wetting substrate, a transient liquid metal underlayer, and a magnetic film outer layer.

A further object of the invention is the provision of a magnetic medium composed of a non-wetting substrate, a transient liquid metal underlayer and a magnetic film layer where the surface roughness of the magnetic film layer is controllable by adjusting the transient liquid metal underlayer thickness and deposition temperature.

A still further object of the invention is the provision of a magnetic medium composed of a non-wetting substrate, a transient liquid metal underlayer, a metallic film interlayer and a magnetic film outerlayer.

An object of the invention is the provision of a method of manufacturing a magnetic medium composed of a non-wetting substrate, a transient liquid metal layer, a metallic film interlayer and a magnetic film outerlayer.

Further and still other objects of the present invention will become more clearly apparent when the following description is read in conjunction with the accompanying drawings.

BRIEF DESCRIPTION OF THE DRAWING

FIG. 10 is a cross-sectional representation of an alternative preferred magnetic medium manufactured in accordance with the present invention;

DETAILED DESCRIPTION

Figure 1A:
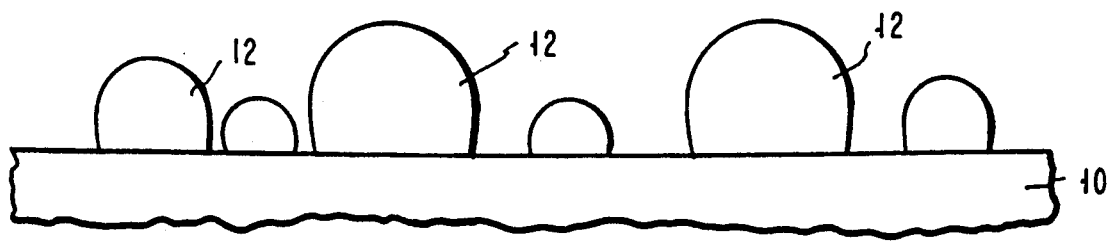
FIG. 1A is a cross-sectional representation of a transient liquid metal layer deposited on substrate in accordance with the present invention.

Referring now the FIGURES and to FIG. 1A in particular, there is shown in accordance with the present invention a substrate 10 such as silicon dioxide, glass, polymer or thin coating thereof on any suitable non-magnetic storage disk material. The substrate is selected to be non-wettable by liquid metals.

As used in the context of this invention, the term non-wettable refers to the break up of a liquid uniformly deposited film to form a distribution of disconnected liquid metal features due to the lack of wetting or interaction between a substrate and the liquid metal.

Figure 1B:
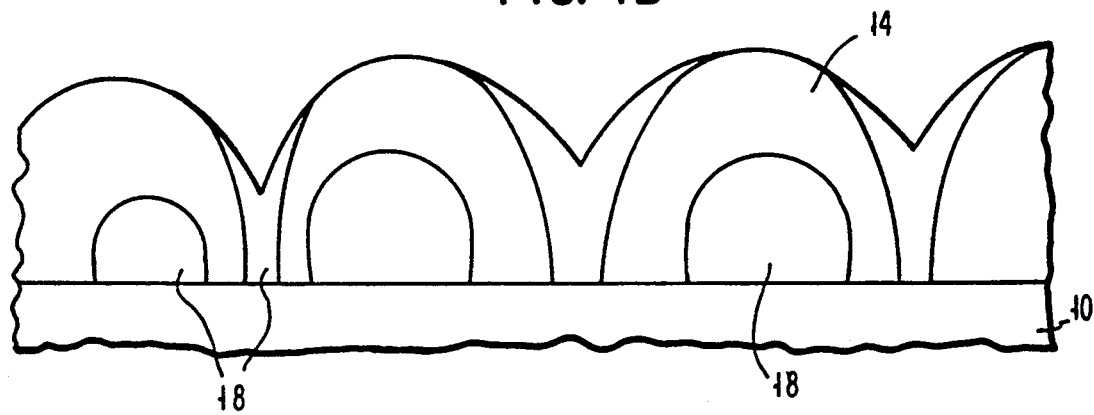
FIG. 1B is a cross-sectional representation of a magnetic medium manufactured in accordance with the present invention.
Figure 1C:
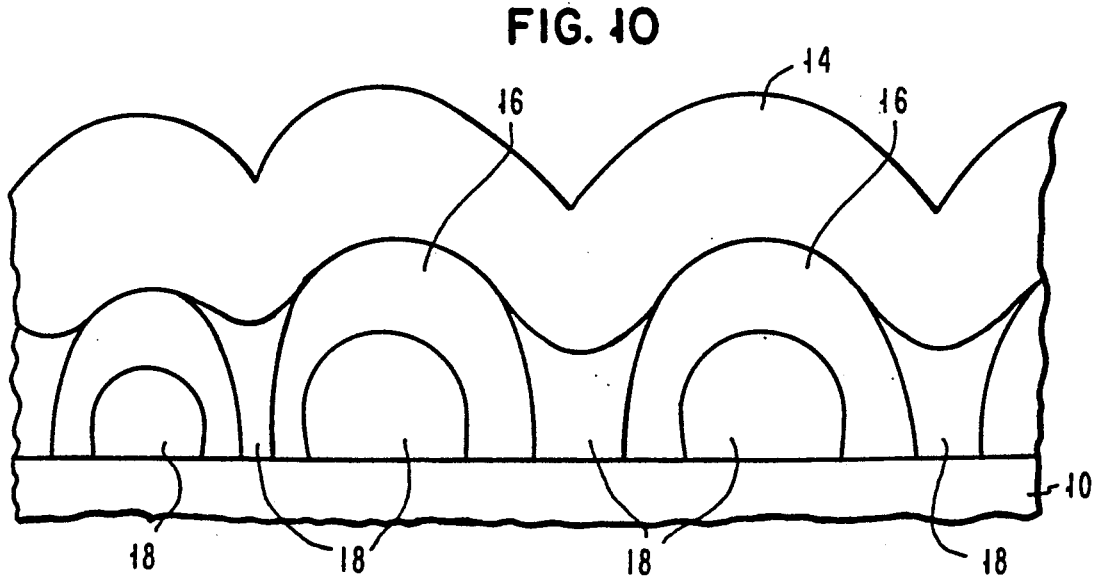

Deposited upon the substrate is an underlayer of a transient liquid metal 12 such as gallium, indium, tin, bismuth, lead, cadmium, mercury, selenium, tellurium and their alloys with other elements, including silver, palladium, platinum or gold as well as binary or ternary compounds of the transient liquid metals themselves. The preferred transient liquid metals are gallium, indium and tin. The average film 12 thickness is the range between approximately 25Å and 300Å, preferably in the range between 25Å and 100Å. The term transient liquid metal layer refers to the temporary existence of the liquid metal layer, until a deposition of a sufficient quantity of a magnetic alloy material results in the dissolution and reaction of the liquid metal in the magnetic alloy, with the substantially complete disappearance of the liquid phase from the magnetic medium structure. As a result, in the final magnetic medium there is no distinct transient liquid metal film layer, but rather there is an intergranular segregation of such metal, as shown in FIG. 1B. The transient liquid metal layer is applied to the substrate while the substrate is maintained at a temperature in excess of the melting point of the transient liquid metal. In the example of a gallium film, the substrate is held at a temperature above approximately 30° C. during transient liquid metal deposition. Due to the poor wetting of the substrate by the liquid metal, the liquid metal forms spherical features as shown in FIG. 1A.

The transient liquid metal film underlayer is applied onto the substrate by conventional means such as vapor deposition or sputtering and the like while the substrate is maintained at a temperature above the melting point of the transient liquid metal. A magnetic film 14 is deposited onto the transient liquid metal film layer in a conventional manner with the substrate and transient liquid metal being held either at a temperature above the melting point of the transient liquid metal or at any lower conventionally used temperature at which the transient liquid metal underlayer still exists in a liquid state. If the underlayer is allowed to solidify prior to deposition of the magnetic layer, it will exist in the resulting magnetic medium as a discrete layer and may adversely affect the mechanical and adhesion properties of the magnetic disk. The magnetic film preferably is Co-Pt-Cr but any other magnetic thin film material may also be used in practicing the invention. The thickness of the magnetic film is in the range between 100Å and 1500Å, preferably in the range between 200Å and 1000Å.

The surface of magnetic film 14 generally follows the topology of the spherical structures of the transient liquid metal layer and exhibits regions of increased concentration of the transient liquid metal 18, e.g. gallium, in the area between the resulting magnetic film grains and in the area where the spherical structures were originally located.

As is well known in the art, a top coat, typically carbon, and a lubricant can be applied to the magnetic medium and is required for many applications. Such a treatment is fully compatible with the magnetic medium described herein.

While in the prior art the substrate has been mechanically roughened to control the topology of the subsequently deposited magnetic film layer, problems have occurred as mentioned above. In accordance with the teachings of the present invention, the magnetic film layer topology is controlled by adjusting the thickness of the transient liquid metal layer thereby obviating the problems associated with mechanical roughening while maintaining, and even improving, the magnetic properties of the medium.

FIG. 2A to 2D are scanning electron microscope images of evaporated gallium films deposited over a silicon dioxide substrate at a temperature above the melting point of gallium. By virtue of the non-wettability of the substrate, rather than the gallium forming a smooth uniform film layer, the gallium forms many spherical structures or features. The quantity of the spherical structures and the size distribution of the structures are dependent upon the average thickness of the gallium layer, temperature of the substrate during deposition, and the degree of wetting of the substrate by the transient liquid metal. The degree of wetting of the substrate can be affected by the addition of alloying elements to the gallium, particularly alloying elements that strongly interact with the substrate material.

Figure 2A:
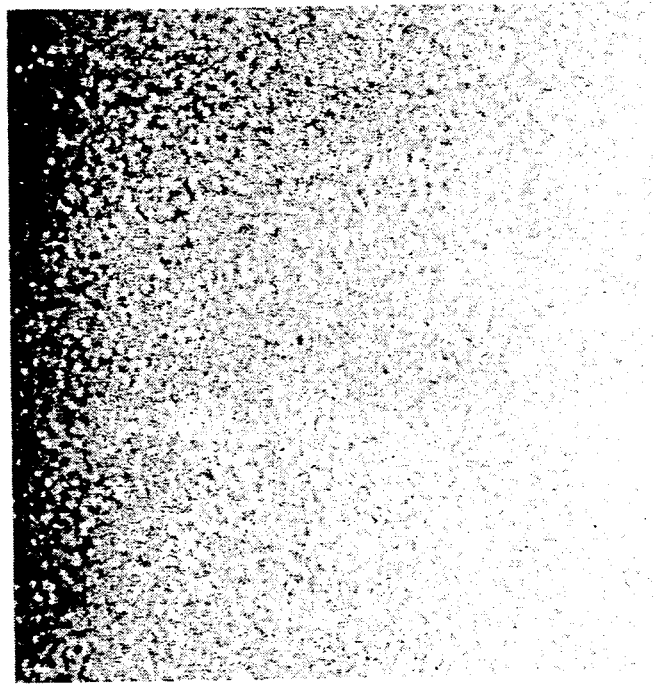
FIGS. 2A to 2D are SEM images of the surface topology evaporated gallium film of 25, 50, 100 and 200Å average thickness respectively applied to a silicon dioxide substrate.
Figure 2B:
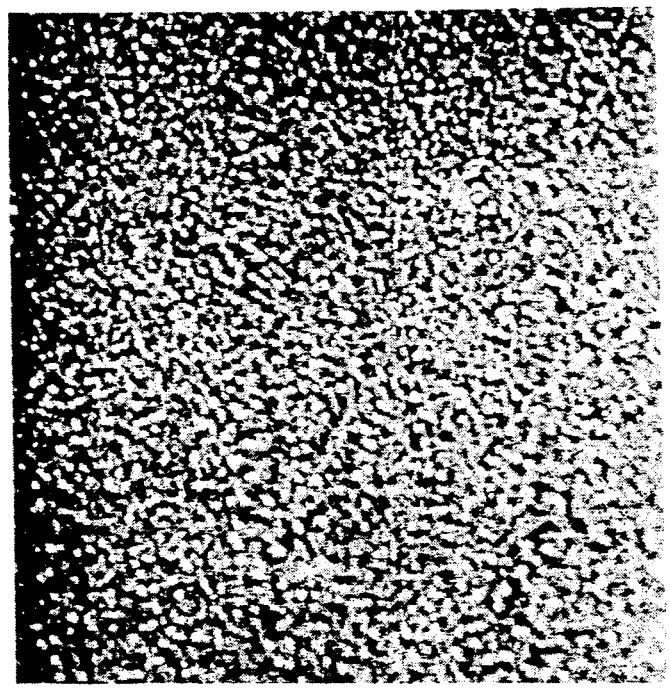
Figure 2C:
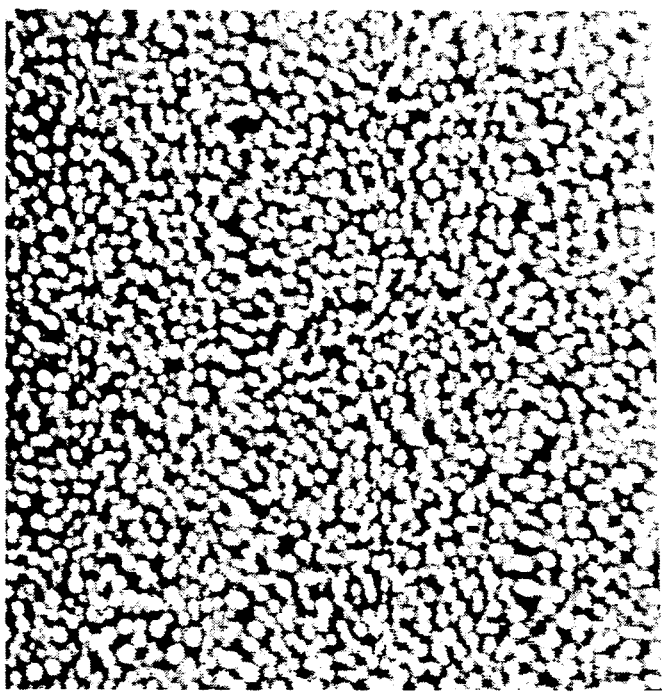
Figure 2D:
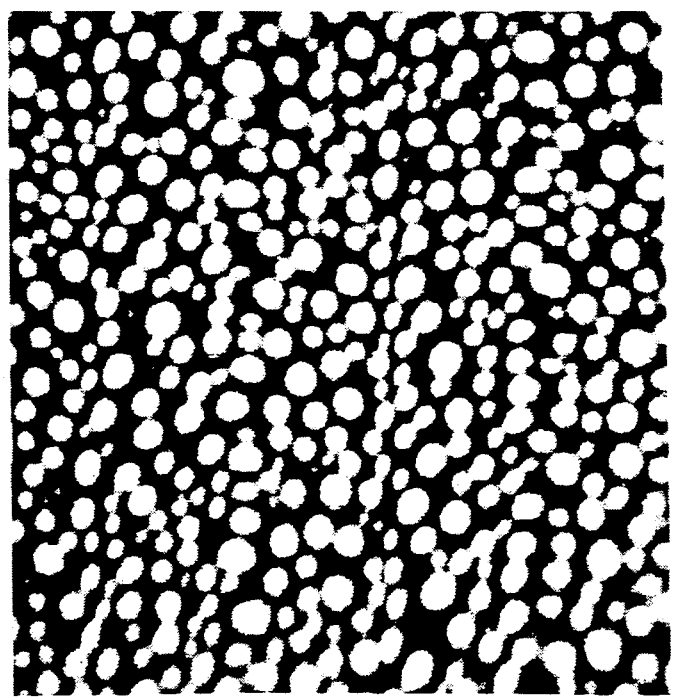

The thickness dependency in the case of pure gallium deposited onto a silicon dioxide substrate maintained at 32° C. to 35° C. during deposition is shown in FIGS. 2A to 2D. FIG. 2A is a scanning electron microscope image of a 25Å thick layer of evaporated gallium film on a silicon dioxide substrate. FIG. 2B is a scanning electron microscope image of a 50Å thick layer of evaporated gallium film on a silicon dioxide substrate. FIG. 2C is a scanning electron microscope image of a 100Å thick layer of evaporated gallium film on a silicon dioxide substrate. FIG. 2D is a scanning electron microscope image of a 200Å thick layer of evaporated gallium film on a silicon dioxide substrate.

It will be apparent from the FIGS. 2A to 2D that the quantity of the spherical structures per unit surface area decreases with increasing gallium film layer thickness and the size of the spherical structures increases with increasing gallium film layer thickness.

Figure 3A:
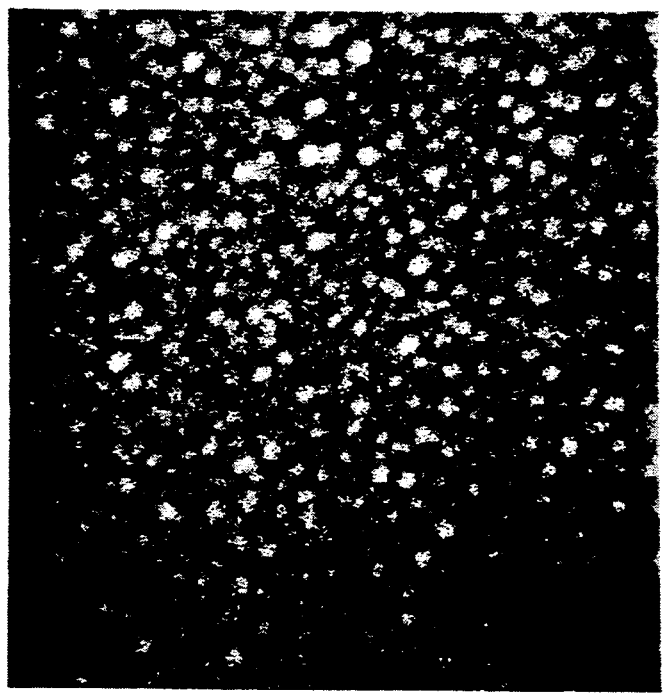
FIGS. 3A to 3D are SEM images of the surface topology of the structures obtained by when sputter depositing 750Å of Co-Pt-Cr alloy film over 25, 50, 100 and 200Å thick film of Ga respectively on a silicon dioxide substrate.
Figure 3B:
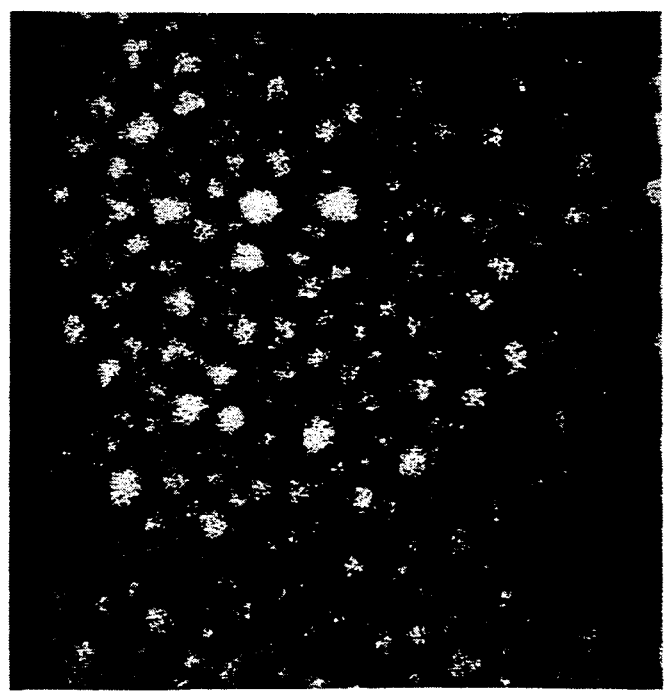
Figure 3C:
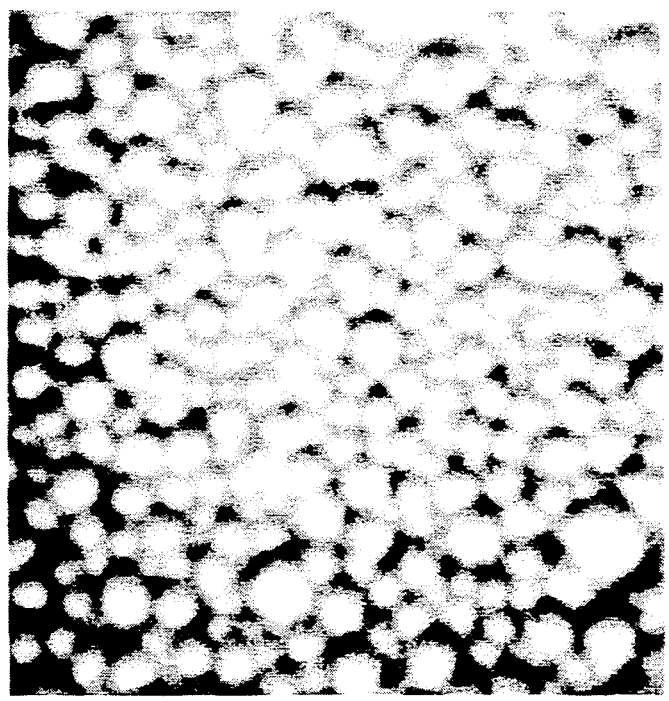
Figure 3D:
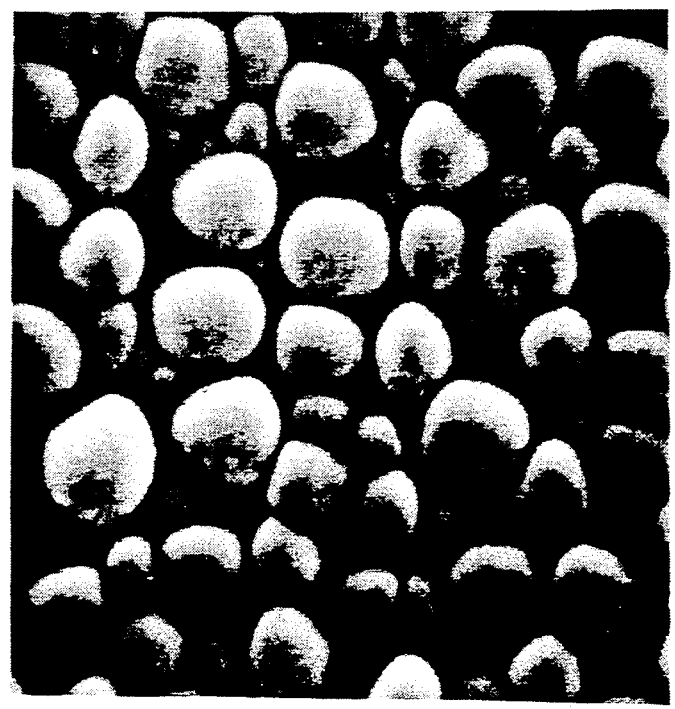

In manufacturing a preferred embodiment of the medium a 750Å thick Co-Pt-Cr alloy magnetic film layer is deposited over a layer of gallium which was previously deposited on a silicon dioxide substrate. The gallium will dissolve or alloy with the cobalt, platinum and chromium and the gallium layer will in effect disappear as a distinct film layer. The surface topology of the magnetic film layer is shown in the scanning electron microscope images of FIGS. 3A to 3D. In FIG. 3A a 750Å thick magnetic film layer was deposited over a 25Å average thickness layer of gallium. In FIG. 3B a 750Å thick magnetic film layer was deposited over a 50Å average thickness layer of gallium. In FIG. 3C a 750Å thick magnetic film layer was deposited over a 100Å thick magnetic film layer. In FIG. 3D a 750Å thick magnetic film layer was deposited over a 200Å average thickness layer of gallium.

Examination of the FIGS. 3A to 3D shows that with increasing underlayer film thickness, there is manifest in the magnetic film layer surface fewer and larger spherical structures. It will be apparent to those skilled in the art that the surface topology and morphology of the outer magnetic film layer is controllable by the selection of the average thickness of the transient liquid metal film underlayer.

Figure 4:
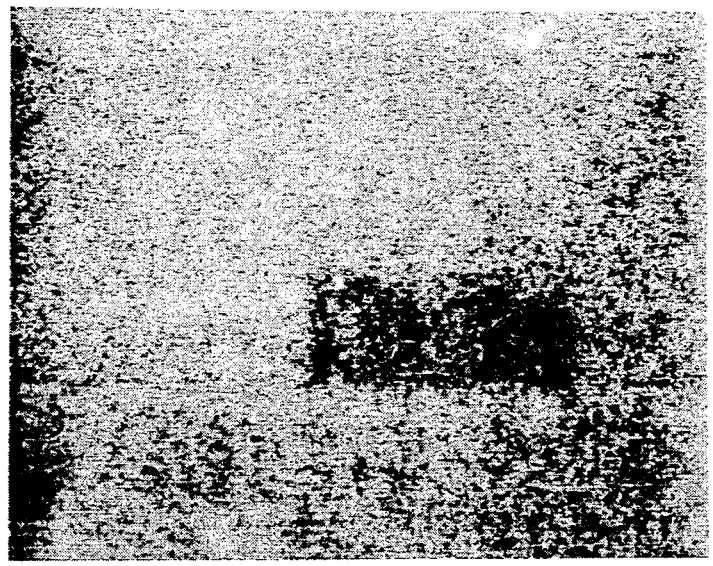
FIG. 4 is a SEM image of the surface topology of a sputtered Co-Pt-Cr film without any transient liquid metal underlayer.

As a comparison and to further demonstrate the effect of the transient liquid metal underlayer, FIG. 4 is a scanning electron microscope image of the surface of a layer of Co-Pt-Cr alloy magnetic film deposited directly onto the substrate without an intervening gallium layer. The image in FIG. 4 does not show any clearly defined topology.

The effect of the gallium underlayer on the magnetic film layer is believed to be due to the disparity of conditions for film nucleation and growth on the surface of the gallium spheres and on the silicon oxide, and by possible shadowing effects due to the spherical shape of the gallium surface features.

An important consideration in the manufacture of a magnetic medium is the affect each of the layers has with regard to the coercive force of the magnetic material layer and the coercive squareness ratio.

FIGS. 5 to 9 are graphical representations of the magnetic properties of a 750Å thick layer of Co-Pt-Cr alloy film deposited on an underlayer of gallium of different average thickness deposited on a silicon dioxide substrate.

Figure 5:
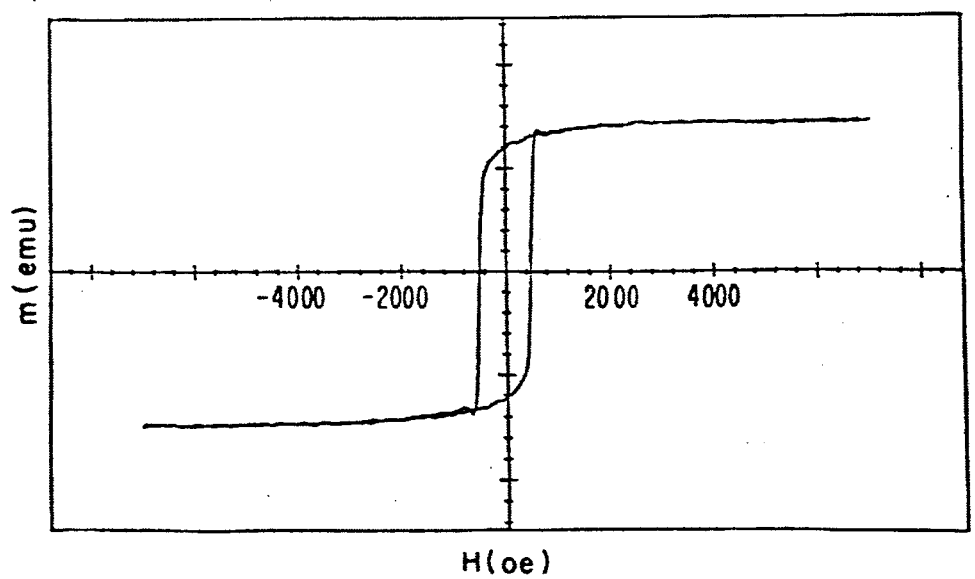
FIG. 5 is a graphical representation of the magnetic properties of 750Å thick Co-Pt-Cr film without any underlayer.
Figure 6:
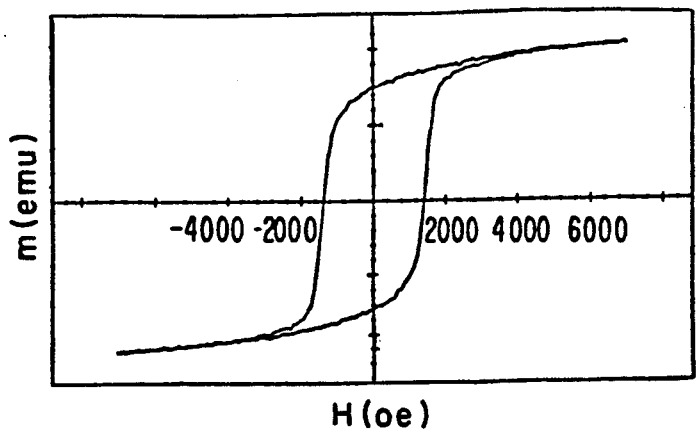
FIG. 6 is a graphical representation of the magnetic properties of 750Å thick Co-Pt-Cr film sputtered on a 25Å thick layer of gallium deposited onto a clean silicon dioxide substrate.
Figure 7:
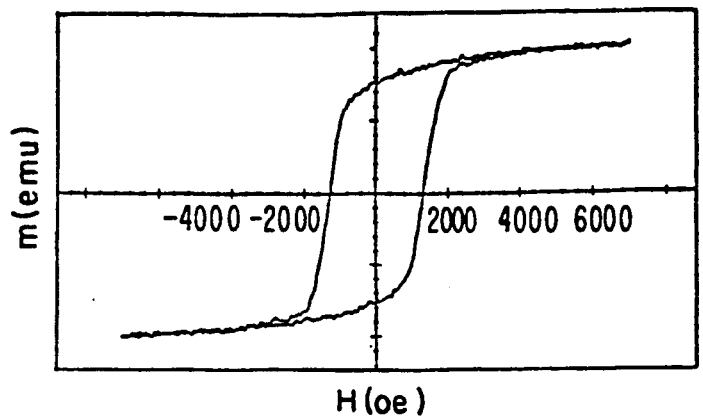
FIG. 7 is a graphical representation of the magnetic properties of 750Å thick Co-Pt-Cr film sputtered onto a 50Å thick layer of gallium deposited on a clean silicon dioxide sub-strate.
Figure 8:
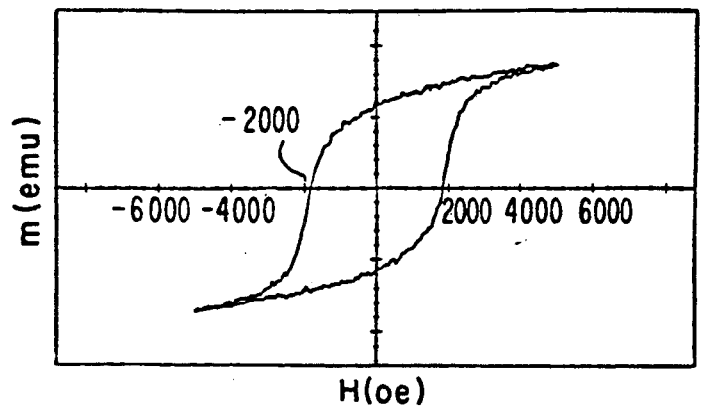
FIG. 8 is a graphical representation of the magnetic properties of 750Å thick Co-Pt-Cr film sputtered onto a 100Å thick layer of gallium deposited on a clean silicon dioxide sub-strate.
Figure 9:
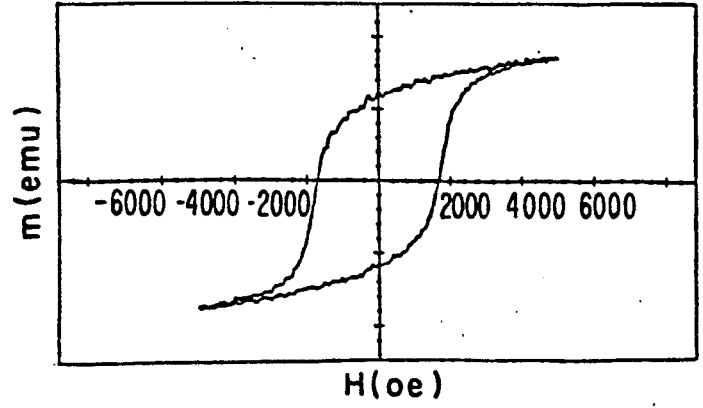
FIG. 9 is a graphical representation of the magnetic properties of 750Å thick Co-Pt-Cr film sputtered onto a 200Å thick layer of gallium deposited on a clean silicon dioxide substrate.

In FIG. 5 there is no gallium underlayer, the magnetic layer is deposited directly onto the substrate. In FIG. 6 there is a 25Å average thickness of the gallium layer. In FIG. 7 there is a 50Å average thickness gallium layer. In FIG. 8 there is a 100Å average thickness of the gallium layer. In FIG. 9 there is a 200Å average thickness of the gallium layer.

The increase of coercivity H due to the gallium underlayer becomes apparent when comparing the value of 485 Oe for the sample without a gallium underlayer in FIG. 5 with the values of 1384 Oe, 1292 Oe, 1829 Oe and 1680 Oe for the samples in FIGS. 6 though 9 where the average gallium layer thickness is 25Å, 50Å, 100Å and 200Å respectively. Referring to the graphical representations, there is also manifest a decrease in the B-H loop squareness as the gallium underlayer thickness is increased as indicated by the lower squareness ratio (SR) and coercive squareness ratio (S*) values with increasing average gallium layer thickness as shown in the following Table I.

TABLE I

| Ga Thickness (AÅ) | Hc (Oe) | SR | S* |
|---|---|---|---|
| 0 | 485 | .8237 | .8283 |
| 25 | 1384 | .7110 | .8251 |
| 50 | 1292 | .7470 | .6996 |
| 100 | 1829 | .6752 | .6676 |
| 200 | 1680 | .6808 | .5839 |

While increased thickness of the gallium underlayer positively affects topology and coercivity of the magnetic thin films, excessive underlayer thicknesses may drastically reduce remanent magnetization, and therefore the read-write characteristics of the magnetic medium. The effect is due to excessive reactions between the transient liquid metal and the magnetic alloy, resulting in the overall reduction of the magnetic phase. In such instances metal film interlayer 16 of chromium, palladium, tantalum, molybdenum, or vanadium, with chromium being the preferred material, is deposited on the transient liquid metal film 12 deposited on substrate 10 as shown schematically in FIG. 10. The magnetic film layer is then deposited onto the metal film interlayer. While not limited to the elements mentioned above, such interlayer is required to form an intermetallic compound with the gallium which is rich in gallium, with the preferred atomic composition being $Ga_6B$, where B is the barrier element, such as chromium. The result is early solidification of the liquid underlayer even with thin barrier layer, since 1 atom of Cr combines with 6 atoms of Ga in a solid compound.

Figure 11:
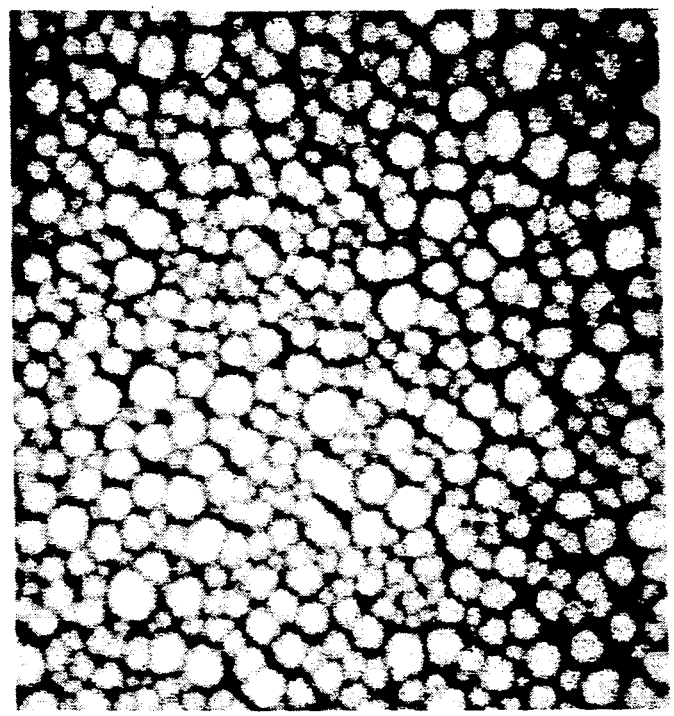
FIG. 11 is a SEM image of surface topology of a 750Å thick layer of Co-Pt-Cr alloy film applied onto an interlayer of 100Å thick Cr film which is applied on a 100Å thick layer of gallium deposited on a silicon dioxide substrate.
Figure 12:
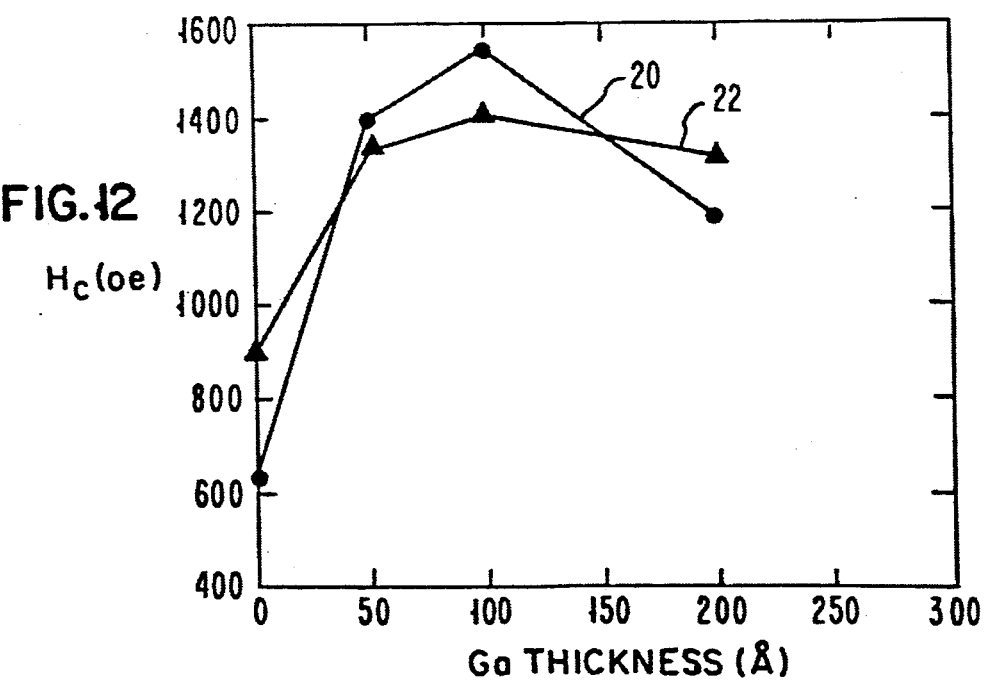
FIG. 12 is a graphical representation of the coercivity of Co-Pt-Cr alloy film deposited onto a Cr interlayer film deposited on a gallium underlayer of different thicknesses.

FIG. 11 is a scanning electron microscope image of the magnetic film layer of a medium composed of a silicon dioxide substrate on which a 100Å average thickness underlayer of gallium has been deposited, followed by a barrier metal film interlayer of 100Å thick chromium layer on which a 750Å thick Co-Pt-Cr alloy magnetic film layer has been deposited.

A comparison of FIG. 3C and FIG. 11 shows that the morphology is substantially the same as the film deposited on a 100Å thick underlayer of gallium without a chromium interlayer. Moreover, the addition of the chromium interlayer permits control of the surface topology over a wide range of surface roughness to improve the tribology while still maintaining high coercivity of the film. Curve 20 shows the coercivity (Hc) as a function of gallium underlayer thickness with a 300Å thick Co-Pt-Cr alloy magnetic film layer. Curve 22 shows the coercivity (Hc) as a function of gallium underlayer thickness with a 100Å thick layer of chromium deposited on the gallium underlayer and a 300Å thick Co-Pt-Cr alloy magnetic film layer deposited or the chromium layer. Curve 22 shows that high coercivity is also achieved with the chromium barrier interlayer.

Additional measurements have shown that the chromium layer seals the gallium underlayer without adversely affecting the magnetization characteristics of the medium.

The tribological performance of the magnetic films with the topology controlled according to the present invention is superior to the performance achieved with conventional magnetic films.

Results of tribology tests on a smooth glass substrate are shown in the table below.

TABLE II

| | Start/Stop Test measurements, after 3000 start and stop cycles. | | |
|---|---|---|---|
| Ga (Å) | Cr (Å) | CoPtCr (Å) | Stiction (g) |
| 0 | 0 | 600 | >20 |
| 50 | 200 | 600 | 4 |
| 50 | 0 | 600 | 4.2 |
| 100 | 0 | 600 | 3.8 |
| 200 | 200 | 600 | 2.05 |

As shown in the table above, the use of a transient liquid metal underlayer during manufacture of a magnetic medium, with or without a chromium or other metal interlayer, reduces the stiction as compared to a magnetic medium manufactured without the use of a transient liquid metal underlayer. It will be apparent to those skilled in the art that it is possible by masking of the substrate t limit the deposits of the transient liquid metal underlayer to predetermined locations on the substrate. As a result, the surface roughness of the magnetic medium can be varied at different locations on the medium.

While there has been described and illustrated a preferred magnetic medium and a method of manufacturing such media and variations thereof, it will be apparent to those skilled in the art that further modifications and variations are possible without deviating from the broad scope of the present invention which shall be limited solely by the scope of the claims appended hereto.

What is claimed is:

1. A magnetic storage medium comprising:
   a substantially non-wettable substrate;
   a transient liquid metal layer of a thickness substantially in the range of 25-300 angstroms deposited upon said substrate while said substrate is maintained at a temperature in excess of the melting point of said liquid metal to form a distribution of disconnected molten metal spherical structures;
   an intermediate metal film layer deposited upon said transient liquid metal layer; and
   a magnetic film layer subsequently deposited on said intermediate metal film layer, whereby said intermediate metal film layer controls reaction of said transient liquid metal and said magnetic film layer.

2. A magnetic storage medium as set forth in claim 1 wherein said transient liquid metal layer is selected from the group consisting of gallium, indium, tin, bismuth, lead, cadmium, mercury, selenium, tellurium and their alloys with other metals including silver, palladium, platinum and gold, and binary and ternary compounds of the liquid metals.

3. A magnetic storage medium as set forth in claim 1, wherein said magnetic film layer is an alloy of which cobalt is is a major constituent 4. A magnetic storage medium as set forth in claim wherein said magnetic film layer is selected from the group consisting of Co-Pt-Cr, Co-Cr, Co-Ni-Cr, and Co-Re.

5. A magnetic storage medium as set forth in claim 1 wherein said transient liquid metal comprises gallium.

6. A magnetic storage medium as set forth in claim 1 wherein said transient liquid metal comprises indium.

7. A magnetic storage medium as set forth in claim 1 wherein said substrate is selected from the group consisting of silicon dioxide, glass, polymers and metal substrates treated in such a manner as to be rendered substantially non-wettable to said transient liquid metal.

8. A magnetic storage medium as set forth in claim 1 wherein said thickness is selected for controlling the topology of said magnetic film layer.

9. A magnetic storage medium as set forth in claim 8 wherein said transient liquid metal layer is deposited at a preselected region of said substrate.

10. A magnetic storage medium as set forth in claim 1, wherein said intermediate metal film layer is selected from the group consisting of chromium, palladium, tantalum, molybdenum and vanadium.

11. A magnetic storage medium as set forth in claim 1, wherein said transient liquid metal is deposited at a preselected region of said substrate.

12. A magnetic storage medium having controllable surface surface topology comprising:
   a substantially non-wettable substrate;
   a transient liquid metal layer of a thickness substantially in the range of 25-300 angstroms deposited upon said substrate while said substrate is maintained at a temperature in excess of the melting point of said liquid metal to form a distribution of discontinued molten metal spherical structures, wherein said transient liquid metal is selected from the group consisting of gallium, indium, thin, bismuth, lead, cadmium, mercury, selenium, tellerium and their alloys with other metals including silver, palladium, platinum and gold, and binary and ternary compounds of the liquid metals;
   an intermediate metal film layer deposited upon said transient liquid metal layer, and
   a magnetic film layer subsequently deposited upon said intermediate metal film layer, wherein said intermediate metal film layer controls reaction of said transient liquid metal and said magnetic film layer and said predetermined thickness is selected for controlling the topology of said magnetic film layer.

13. A magnetic storage medium as set forth in claim 12 wherein said intermediate metal film layer is selected from group consisting of chromium, palladium, tantalum, molybdenum and vanadium.

14. A magnetic storage medium as set forth in claim 13 wherein said magnetic layer is an alloy of which cobalt is a major constituent.

15. A magnetic storage medium as set forth in claim 14 wherein said magnetic layer is selected from the group consisting of Co-Pt-Cr, Co-Cr, Co-Ni-Cr and Co-Re.

* * * * *

UNITED STATES PATENT AND TRADEMARK OFFICE
CERTIFICATE OF CORRECTION

PATENT NO. : 5,134,038
DATED : July 28, 1992
INVENTOR(S) : ROBERT J. BASEMAN, CHRISTOPHER V. JAHNES, IGOR Y. KHANDROS SEYYED M.T. MIRZAMAANI, MICHAEL A. RUSSAK It is certified that error appears in the above—identified patent and that said Letters Patent is hereby corrected as shown below:

Column 8, line 61, after the word "claim" insert --3--.

Signed and Sealed this

Fourteenth Day of September, 1993

Attest:

BRUCE LEHMAN

Attesting Officer

Commissioner of Patents and Trademarks